May 9, 1967 G. LANGE ET AL 3,318,442
APPARATUS FOR MECHANIZING THE CULTIVATION OF PLANTS
Filed July 14, 1965 2 Sheets-Sheet 1

INVENTORS:
Gertrud Lange
Günter Schöll

BY Ross & Mestern

May 9, 1967  G. LANGE ET AL  3,318,442
APPARATUS FOR MECHANIZING THE CULTIVATION OF PLANTS
Filed July 14, 1965  2 Sheets-Sheet 2
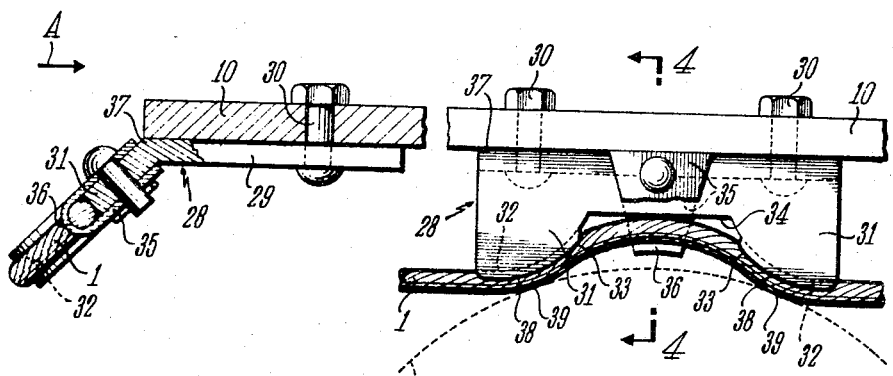
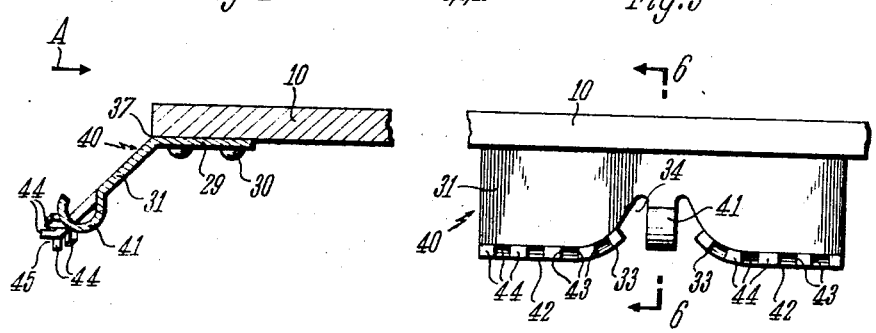
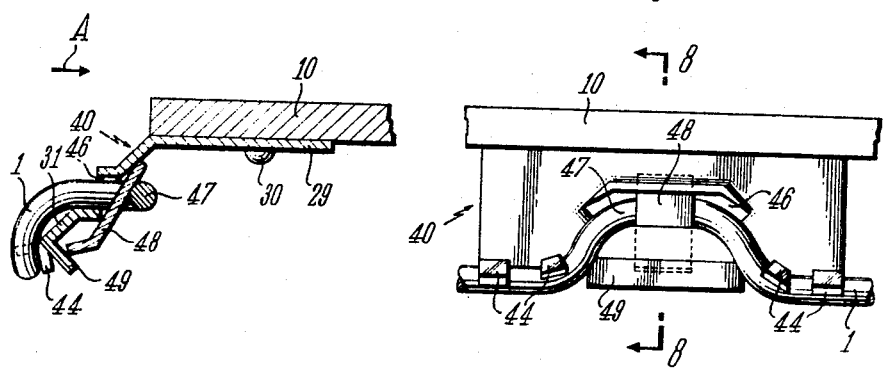
INVENTORS:
Gertrud Lange
Günter Schöll
BY  Ross & Mestern United States Patent Office 3,318,442
Patented May 9, 1967

3,318,442
APPARATUS FOR MECHANIZING THE CULTIVATION OF PLANTS
Gertrud Lange, Holzgartenstrasse 9, Stuttgart, Germany, and Günter Schöll, Mulbergerstrasse 21A, Esslingen (Neckar), Germany
Filed July 14, 1965, Ser. No. 471,917
Claims priority, application Germany, July 17, 1964, L 48,321
12 Claims. (Cl. 198—181)

ABSTRACT OF THE DISCLOSURE

This disclosure is directed to a conveyor installation for the mechanization of plant cultivation and the like wherein a multiplicity of horizontal tables are displaced by an endless cable along a closed transport path and are cantilevered to the cable which carries part of the load of the tables while another part of the load is carried by a rail lying outwardly of the cable.

The present invention relates to a cultivating and conveying apparatus which permits the cultivation of plants, especially in greenhouses or the like, to be mechanized by moving the areas in which the plants are to grow and are to be cultivated past a plurality of work stations.

Although the conveying apparatus which have in the past been employed for this purpose were quite successful insofar as they greatly facilitated the various cultivating operations and resulted in considerable savings in manual labor and in the time involved for carrying out the necessary work, these apparatus which consisted, for example, of conveyer belts or more complicated conveying means and were generally of a type similar to the conveying apparatus as employed in manufacturing and other industrial plants, involved such high costs of investment and maintenance in comparison to the size and weight of the cultivating area which could be attained that these apparatus and conveying methods were found in most cases to be too uneconomical to be of practical value. Investigations have thus shown that the annual profit even of more expensive plants which require considerable cultivating operations can be increased by the use of such conventional conveying apparatus only to such an extent that no more than one fifth to one tenth of the cost of the conveying apparatus as used in manufacturing plants are economically feasable. The costs of such conveying apparatus are generally further increased due to the fact that, in order to be suitable for use in plant cultivation, they must be very resistant to the effects of dirt and moisture and must require very little service to maintain them at all times in proper operation.

The principal objects of the present invention are to provide a cultivating and conveying apparatus for mechanizing the cultivation of plants which overcomes the above-mentioned disadvantages of the apparatus which have heretofore been proposed or employed for the same purpose, and which not only complies with the requirements as stated above, but may be produced at such a low cost that the increase in the output of plants which is attainable within a period of two years or less will pay for this investment.

These objects may be attained according to the invention by providing a cultivating and conveying apparatus which comprises a large number of rectangular plant tables or the like, each of which is connected at one narrower side to an endless cable which is movable together with the plant tables within a substantially horizontal plane between and around at least two horizontal cable pulleys which are mounted at a considerable distance from each other. One important feature of this conveying apparatus is the fact that, while being moved in a longitudinal direction between these cable pulleys, the plant tables are located closely adjacent and substantially parallel to each other, and that, while being slowly moved by the cable around the pulleys, the adjacent plant tables will spread so far apart from each other that sector-shaped spaces are formed between them into which a person or persons may enter so as to carry out cultivating operations on these tables also from the longitudinal sides thereof.

The apparatus according to the invention has the advantage that it not only provides a relatively large area on which plants may be grown and cultivated and that it permits this area to be fully utilized, but that it also permits all of the necessary cultivating operations to be carried out very easily on the plant tables, even though they may have a length of 1 to 1.50 m. and more. This may be attained by making the cable pulleys around which the plant tables are moved at the opposite ends of the conveyer of such a small diameter that the distance at which two adjacent plant tables are spaced from each other during their longitudinal travel will amount to a relatively large part of the circumference of each cable pulley, which has the result that, when the plant tables are passing around the cable pulleys, the adjacent tables which are otherwise located closely adjacent to each other will be spread widely apart so that large sector-shaped areas are formed between them into which a person may enter to carry out the necessary cultivating operations from the longitudinal sides of each plant table.

The above-mentioned as well as numerous additional features and advantages of the present invention will become more clearly apparent from the following detailed description thereof which is to be read with reference to the accompanying drawings, in which—

FIGURE 4 shows a cross section which is taken along the line 4—4 of FIGURE 5 of a connecting element between the cable and a plant table;

FIGURE 5 shows a side view of the same connecting element, as seen in the direction of the arrow A in FIGURE 4;

FIGURE 6 shows a cross section which is taken along the line 6—6 of FIGURE 7 of a modification of the connecting element between the cable and a plant table;

FIGURE 7 shows a side view of the connecting element according to FIGURE 6;

FIGURE 8 shows a cross section which is taken along the line 8—8 of FIGURE 9 of a further modification of the connecting element between the cable and a plant table; while FIGURE 9 shows a side view of the connecting element according to FIGURE 8.

Figure 1:
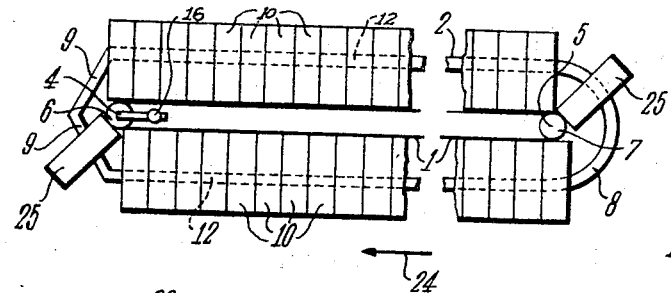
FIGURE 1 shows a diagrammatic illustration of the entire apparatus as seen in a top view thereof.
Figure 2:
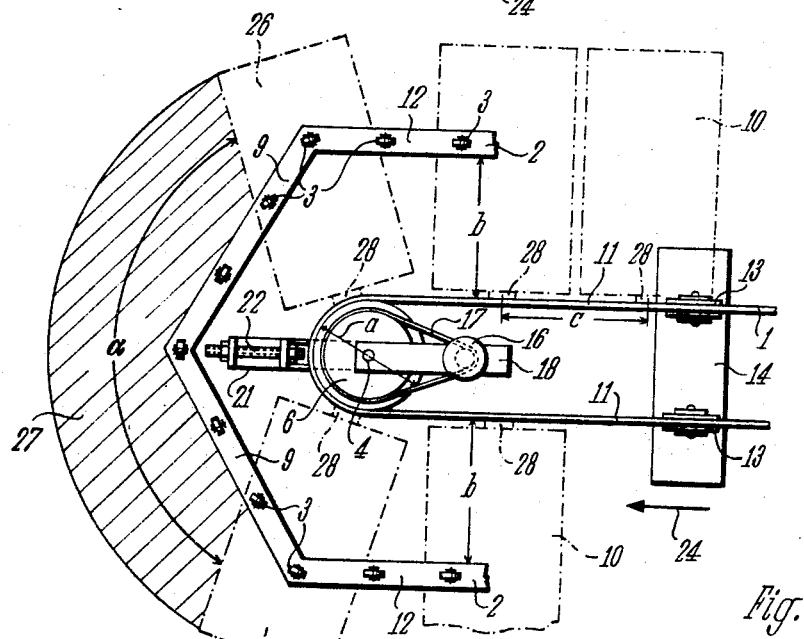
FIGURE 2 shows a top view of the left end portion of the apparatus according to FIGURE 1, but on a larger scale.
Figure 3:
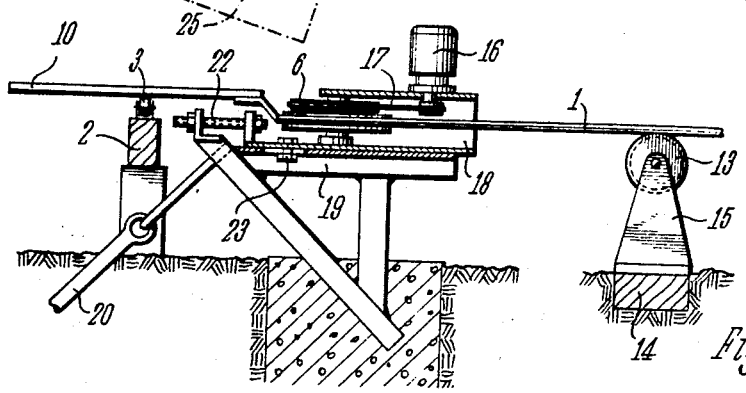
FIGURE 3 shows, partly in section, a side view, of the end portion of the apparatus according to FIGURE 2.

As illustrated diagrammatically in FIGURE 1, the apparatus according to the invention which may be made of any desired length and width comprises an endless cable 1 and outwardly thereof an endless rail 2 on which, as illustrated in FIGURES 2 and 3, a plurality of rollers 3 are mounted which are rotatable about horizontal axes. The cable 1 and rail 2 extend substantially parallel to each other and within two slightly different planes which preferably extend substantially horizontally and parallel to the ground. While cable 1 is tightened between and movable around a pair of cable pulleys 6 and 7 which are rotatable about the axes of their shafts 4 and 5 and have an equal diameter $a$, the two opposite ends of rail $a$ may be either of an arcuate shape 8 or an angular shape 2 which is formed by two arms 9 which extend at an angle of approximately 120° to each other.

The apparatus further comprises a plurality of rectangular plant tables 10 or the like which extend substantially parallel and as closely adjacent to each other as possible while they are located between the two cable pulleys 6 and 7, and they are secured at their inner narrower sides to the cable 1 by means of connecting elements which will be subsequently described in detail. While thus being taken along by the cable 1, these plant tables rest loosely on and slide along the rollers 3 on the rail 2. The distance $b$ between each strand 11 of the cable and the straight parts 12 of rail 2 is made of such a size that the cable 1 which primarily serves for conveying and guiding the plant tables 10 will be relieved as much as possible of the weight thereof so that the predominant part of the load, approximately 80%, will be taken up by the rail 2. For supporting and guiding the cable 1 between the two cable pulleys 6 and 7, the apparatus is further provided, for example, at every 3 to 5 meters, with supporting pulleys 13 which are rotatably mounted on brackets 13 which, in turn, are mounted on crossties 14.

As illustrated in FIGURES 2 and 3, the cable pulley 6 is driven by an electric motor 16 through a belt or chain 17, and the shaft 4 of each pulley 6 and 7 is mounted on a support 18 which is adjustable in its longitudinal direction on a solid stand 19 which is securely moored in the ground directly and by means of a tie rod 20 or the like. For tightening the cable 1, the support 18 which carries the pulley 6 and its driving means 16, 17 may be drawn toward the left of FIGURES 2 and 3 by means of a turnbuckle 22 which is connected near one end to the support 18 and near its other end to the angular bracing bar 21 of the stand 19. After the cable has been adjusted to the proper tension, the support 18 may be locked to the stand 19 by one or more bolts 23.

If the cable 1, to which all of the plant tables 10 are connected at their inner ends at substantially equal distances from each other, is driven by the electric motor 16, for example, in the direction of the arrow 24, the plant tables 10 which are primarily supported at all times by the rail track 2 will follow the direction of travel of the cable and will therefore remain substantially parallel and closely adjacent to each other while traveling in the straight direction until they reach one of the pulleys 6 or 7 when each of them will travel around the pulley and thereby spread apart from the adjacent tables and carry out an arcuate movement until the cable 1 has completed its movement around the pulley and again starts to travel in the straight direction. The speed of travel of the center of gravity of each plant table 10 is then determined by the angular velocity of the cable pulley 6 or 7, while the size of the space 27, as indicated in FIGURE 2 in hatched lines, which extends within the angle $a$ between the two separated tables 25 and 26 and permits work to be carried out also along the longitudinal sides of these tables, depends upon the distance $c$ between the connecting elements 28 of the adjacent plant tables 10, 25, and 26 on the cable 1 and upon the diameter $a$ of the cable pulleys 6 and 7.

FIGURES 4 and 5 illustrate the type of construction of one of these connecting elements 28 for securing a plant table 10 to the cable 1. It consists of a piece of flat iron which is bent so as to enclose an angle of approximately 135°. One arm 29 of this angle iron is secured to the bottom of a plant table 10 by a pair of bolts 30, while its other arm 31 which extends at an angle of approximately 45° to the horizontal plane has an edge portion facing the cable 1 in which a fillet 32 is provided which has a radius corresponding to that of the cable 1 so that the cable will fit snugly therein. In its longitudinal direction, this outer fillet edge of the arm 31 of the angle iron 28 is curved upwardly from both ends, as indicated at 33 in FIGURE 5, and is interrupted by a central recess 34 into which a U-shaped strap 35 projects which is hooked over the cable 1 and connected, for example, by a removable pin, to the arm 31.

The distance between the bent web 36 of each strap 35, which is preferably also curved in the longitudinal direction, and the corner 37 between the two arms 29 and 31 of the angle iron 28 should be so much shorter than the distance between this corner 37 and the outer contact surfaces 38 of the curved fillets 32 that the part of cable 1 which extends through the recess 34 will be of an arcuate shape. Due to this curvature and the tension of cable 1, such a considerable friction is produced between the cable and the curved fillet surfaces 32 of the arm 31 and the upper surface of the web 36 of strap 35 that the connecting element 28 of each plant table will be firmly secured to the cable. Furthermore, the depth of the fillets 32 and the curvature of the fillet edges 33 in their longitudinal direction, as well as the width of the recess 34 are made of such sizes that the peripheral edge surfaces of the cable pulleys 6 and 7 and also of the supporting pulleys 13, as indicated in FIGURE 5 in dotted lines, will not engage with the connecting element 28 but only at the points 39 with the cable parts which project from the fillets 32. This manner of securing the connecting elements 28 to the cable 1 also insures that the load of each plant table 10 insofar as it is not carried by the rail track 2 will be equally transmitted to the cable at both sides of the central strap 36 even while the particular plant table travels around one of the pulleys 6 or 7. Due to the inclination of the outer arm 31 of the angle iron forming the connecting element 28, the cable 1 may also travel without any interference over the supporting pulleys 13 and around the cable pulleys 6 and 7.

FIGURES 6 and 7 illustrate a modification of the connecting element as above described. In this case, it consists of a sheet-metal strip 40 which is bent in the same manner as the angle iron 28 in FIGURE 4 so that its two arms 29 and 31 enclose an angle of approximately 135°. However, this connecting element 40 is provided with a central hook 41 in place of the U-shaped strap 35. Since the sheet-metal strip 40 is not thick enough to allow curved fillets for the cable 1 to be provided in the outer curved edge of the arm 31, this edge is provided at both sides of the recess 34 with notches 43, and the tabs 44 between these notches are alternately bent in one or the other direction, as indicated in FIGURE 6, so that a trough-shaped groove 45 is formed by them which has the same function as the fillet 32 at each side of the arm 31 of the connecting element according to FIGURES 4 and 5, namely, to receive the cable 1 which in this case is looped over the hook 41.

FIGURES 8 and 9 illustrate another modification of the connecting element which in this case also consists of a sheet-metal strip which differs from the strip 40 according to FIGURES 6 and 7 by the fact that in place of the hook 41 a slot 46 is provided into which the loop 47 of the cable 1 is inserted. This loop 47 is locked within the slot 46 by a locking member 48 which is located at the rear side of the strip 40 and is inserted like a bolt transversely of the slot 46 over the loop 47. This locking member 48 is prevented from falling out of the loop 47 by bending the lower end 49 of the central part of the arm 31 toward the rear, as shown in FIGURE 8, so that it will serve as an abutment on which the lower end of the locking member 48 engages.

What has previously been said with reference to FIGURES 4 and 5 about the secure clamping action of the connecting element 31 on the cable 1 which is attained primarily by the tension of the cable and by the manner in which the cable is looped through the connecting element applies equally to the two modifications of this element as illustrated in FIGURES 5 to 9.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. In a conveyor installation for the mechanization of plant cultivation and the like, wherein a multiplicity of generally horizontal tables are displaced along an endless elongated path by an endless flexible element passing around respective drive disks at opposite ends of said path, the improvement wherein:
   (a) said endless flexible element is a cable;
   (b) said tables are mounted at one side thereof on said cable and extend outwardly therefrom; and
   (c) said installation includes first support means including a rail extending around said path and outwardly thereof for supporting at least part of the weight of said tables upon their movement around said path, and second support means disposed along said cable and carrying at least another part of the weight of said tables, each of said tables being provided with an arm having at least a portion bent at an obtuse angle to the horizontal tables and extending inwardly and downwardly therefrom with respect to said path, said arms connecting the respective tables to said cable, said arms engaging said disks during passage therearound.

2. The improvement defined in claim 1 wherein said arm includes an angle of substantially 135° with the horizontal.

3. The improvement defined in claim 2 wherein said arms are each relatively broad plates of sheet metal having downwardly open recesses at an intermediate location therealong, further comprising attachment means engaging said cable on each of said arms and retaining said cable in the recess of a respective arm.

4. A cultivating and conveying apparatus for mechanizing the cultivation of plants, comprising:
   a plurality of rectangular plant tables forming two substantially parallel rows closely adjacent and substantially parallel to each other;
   means for supporting said tables of both rows in a common substantially horizontal plane, said supporting means having ends projecting beyond the ends of both rows and being connected to each other at least at their projecting ends for supporting said tables during their movement from the end of one row to the beginning of the other row;
   at least two rotary members rotatable about substantially vertical axes and located between said two rows near the opposite ends thereof;
   an endless conveying element mounted on and guided by said rotary members, means for driving at least one of said rotary members so as to move said conveying element in a substantially horizontal direction; and
   means for connecting the shorter sides of said two rows of tables facing each other to said conveying element at points spaced substantially equally from each other, whereby said tables are moved by said conveying element closely adjacent to each other in a substantially straight direction along said supporting means from the beginning to the end of each row, each table arriving at said end then being drawn by said conveying element around one of said rotary members to the beginning of the other row and thereby being spread apart from the adjacent tables and at an angle thereto so as to form a relatively large sector-shaped area between two adjacent tables permitting the entry of an attendant into said area for carrying out operations on said tables from the longitudinal sides thereof without requiring the movement of said tables to be interrupted, said conveying element consisting of an endless cable and said rotary members consisting of cable pulleys, said connecting means comprising a plurality of substantially plate-shaped connecting members, each of said connecting-members being secured at one side to one of the shorter sides of one of said plant tables and having a central recess in its opposite side, the outer edges of said opposite side curving toward said central recess, means for holding said cable on said curved outer edges so that said cable curves through said recess between said edges, and a central member secured to said connecting member and projecting centrally into said recess and over and around said cable, whereby due to the tension of said cable and the resulting friction between said cable and said curved outer edges and said central member, said plant table is secured to said cable so as not to be slidable longitudinally thereon, said holding means on each of said curved outer edges of said plate-shaped connecting member at both sides of said recess being formed by a plurality of cuts provided in said edge so as to form short tabs intermediate said cuts, the adjacent tabs being bent in opposite directions so as to receive said cable between them.

5. An apparatus as defined in claim 4, wherein said supporting means comprise an endless rail extending substantially parallel to said conveying element along the longitudinal sides thereof, and a plurality of rollers rotatably mounted behind each other on said rail and laterally spaced at such a distance from said conveying element so as to bear at least the greater part of the weight of said plant tables which are slidable thereon.

6. An apparatus as defined in claim 4, wherein said supporting means comprise an endless rail extending substantially parallel to and along the longitudinal sides of said conveying element, and a plurality of rollers mounted behind each other on said rail and each being rotatable about an axis extending at right angles to the direction of movement of the table which is supported thereby, said rollers being laterally spaced at such a distance from said conveying element so as to bear at least the greater part of the weight of said plant tables which are slidable thereon.

7. An apparatus as defined in claim 6, in which those of said rollers which are mounted on said projecting outer connecting ends of said rail around the outer side of each rotary member are spaced at a smaller distance from said conveying element than the rollers which are mounted on the longitudinal parts of said rail.

8. An apparatus as defined in claim 4, in which said holding means on each of said curved outer edges of said plate-shaped connecting member at both sides of said recess comprises a channel in said edge adapted to receive said cable.

9. An apparatus as defined in claim 4, in which said central member forms a hook rigidly secured to said plate-shaped connecting member and extending centrally into said recess.

10. A cultivating and conveying apparatus for mechanizing the cultivation of plants, comprising:
    a plurality of rectangular plant tables forming two substantially parallel rows closely adjacent and substantially parallel to each other;
    means for supporting said tables of both rows in a common substantially horizontal plane, said supporting means having ends projecting beyond the ends of both rows and being connected to each other at least at their projecting ends for supporting said tables during their movement from the end of one row to the beginning of the other row;
    at least two rotary members rotatable about substantially vertical axes and located between said two rows near the opposite ends thereof;

an endless conveying element mounted on and guided by said rotary members, means for driving at least one of said rotary members so as to move said conveying element in a substantially horizontally direction; and means for connecting the shorter sides of said two rows of tables facing each other to said conveying element at points spaced substantially equally from each other, whereby said tables are moved by said conveying element closely adjacent to each other in a substantially straight direction along said supporting means from the beginning to the end of each row, each table arriving at said end then being drawn by said conveying element around one of said rotary members to the beginning of the other row and thereby being spread apart from the adjacent tables and at an angle thereto so as to form a relatively large sector-shaped area between two adjacent tables permitting the entry of an attendant into said area for carrying out operations on said tables from the longitudinal sides thereof without requiring the movement of said tables to be interrupted, said conveying element consisting of an endless cable and said rotary members consist of cable pulleys, said connecting means comprising a plurality of plate-shaped connecting members, each of said connecting members being secured at one side to one of the shorter sides of one of said plant tables and having a slot-shaped central aperture in its opposite side, retaining means for holding said cable on the outer edge of said opposite side at both sides of said aperture, said retaining means being formed by a plurality of cuts provided in said edge at both sides of said central aperture so as to form short tabs intermediate said cuts, the adjacent tabs being bent in opposite directions so as to receive said cable between them, said cable forming a loop passing from said tabs at one side of said edge through said aperture and back to said tabs at the other side of said edge, and a locking member inserted from the rear side of said connecting member transversely through said loop and engaging upon said rear side for locking said loop in said aperture.

11. An apparatus as defined in claim 10, in which said two sides of each of said plate-shaped connecting members are bent at an angle approximately 135° relative to each other, one of said sides extending substantially horizontally and being secured to one of said plant tables, while the other side projects at an angle of approximately 45° relative to the horizontal plane toward the cable so as to enable this other side of said connecting member together with said cable to pass freely over said horizontal cable pulleys and any supporting pulleys regardless of whether they extend horizontally or vertically.

12. A cultivating and conveying apparatus for mechanizing the cultivation of plants, comprising:

a plurality of rectangular plant tables forming two substantially parallel rows closely adjacent and substantially parallel to each other;

means for supporting said tables of both rows in a common substantially horizontal plane, said supporting means having ends projecting beyond the ends of both rows and being connected to each other at least at their projecting ends for supporting said tables during their movement from the end of one row to the beginning of the other row;

at least two rotary members rotatable about substantially vertical axes and located between said two rows near the opposite ends thereof;

an endless conveying element mounted on and guided by said rotary members, means for driving at least one of said rotary members so as to move said conveying element in a substantially horizontal direction; and means for connecting the shorter sides of said two rows of tables facing each other to said conveying element at points spaced substantially equally from each other, whereby said tables are moved by said conveying element closely adjacent to each other in a substantially straight direction along said supporting means from the beginning to the end of each row, each table arriving at said end then being drawn by said conveying element around one of said rotary members to the beginning of the other row and thereby being spread apart from the adjacent tables and at an angle thereto so as to form a relatively large sector-shaped area between two adjacent tables permitting the entry of an attendant into said area for carrying out operations on said tables from the longitudinal sides thereof without requiring the movement of said tables to be interrupted, said conveying element consisting of an endless cable and said rotary members consisting of cable pulleys, said connecting means comprising a plurality of substantially plate-shaped connecting members, each of said connecting members being secured at one side to one of the shorter sides of one of said plant tables and having a central recess in its opposite side, the outer edges of said opposite side curving toward said central recess, means for holding said cable on said curved outer edges so that said cable curves through said recess between said edges, and a central member secured to said connecting member and projecting centrally into said recess and over and around said cable, whereby due to the tension of said cable and the resulting friction between said cable and said curved outer edges and said central member, said plant table is secured to said cable so as not to be slidable longitudinally thereon, said two sides of each of said plate-shaped connecting members being bent at an angle of approximately 135° relative to each other, one of said sides extending substantially horizontally and being secured to one of said plant tables, while the other side projects at an angle of approximately 45° relative to the horizontal plane toward the cable so as to enable this other side of said connecting member together with said cable to pass freely over said horizontal cable pulleys and any supporting pulleys regardless of whether they extend horizontally or vertically.

References Cited by the Examiner

UNITED STATES PATENTS

| | | | |
|---|---|---|---|
| 833,774 | 10/1906 | Clark | 198—181 |
| 1,031,202 | 7/1912 | Sample et al. | 198—181 X |
| 1,431,375 | 10/1922 | Dalrymple | 24—135 X |
| 1,608,662 | 11/1926 | Nourse | 24—130 X |
| 1,831,634 | 11/1931 | Pedersen et al. | 198—181 X |
| 2,057,950 | 10/1936 | Howison | 198—181 |
| 2,466,083 | 4/1949 | Crosby | 24—129 |
| 2,649,100 | 8/1953 | French. | |
| 3,150,766 | 9/1964 | Mackintosh | 198—130 X |

FOREIGN PATENTS 326,134  5/1935  Italy.

EVON C. BLUNK, *Primary Examiner.*

R. J. HICKEY, *Assistant Examiner.*